Patented Feb. 1, 1949

2,460,776

UNITED STATES PATENT OFFICE 2,460,776

BACTERIOSTATIC BASE FOR MEDICINAL, COSMETIC, AND TOILET PREPARATIONS

James G. Vincent, Rochester, N. Y., assignor to The Noned Corporation, a corporation of New York No Drawing. Application November 19, 1945, Serial No. 629,721

17 Claims. (Cl. 167—58)

This invention relates to new compositions, including a new fluid base composition, a new fused bentonite sulfur composition, and other compositions made with said fluid base composition.

The new fluid base composition is a valuable vehicle for medicinals and cosmetics and as a stabilizer for labile medicaments and antibiotics. It is a valuable synergistic, medicinal, and cosmetic vehicle which combines the properties of a carrier and of a wetting and penetrating agent, in addition to a bacteriostatic action which is not inhibited in in vitro test by the presence of 10 per cent defibrinated blood.

The fluid base composition is itself a valuable composition for topical and intra-cavitary medication because of its bacteriostatic and other properties. The fluid base has a bacteriostatic and mildly bactericidal action against gram negative as well as against gram positive organisms, and its bacteriostatic action is effective in the presence of 10 per cent blood serum.

The fluid base composition has valuable softening and wetting or penetrating action for the hair and skin and can be advantageously used in the preparation of toilet and cosmetic preparations. It is compatible with soap solutions and creams forming therewith improved shaving creams, shampoo compositions, etc.

The new fused bentonite sulfur compositions, made by compounding fused bentonite sulfur with the fluid base, form valuable medicaments for the treatment of various skin diseases and infections, and prophylactic treatment against infection.

Fused bentonite sulfur has been produced commercially for use as an agricultural fungicide (see McDaniel, Industrial and Engineering Chemistry, vol. 26, pages 340-345). It is made by fusing together Wyoming bentonite with sulfur and grinding the resulting product to a fine state of subdivision. The fused bentonite sulfur, when compounded with the fluid base, gives compositions having active bacteriostatic, bactericidal and fungicidal properties.

The fluid base consists essentially of an aqueous solution of an alcohol, glycerin, a carbamide, commercial bile salts and a thickening agent. The alcohol is advantageously ethyl alcohol, or mixtures of ethyl and isopropyl alcohols. The glycerin can be replaced in whole or in part with a monoglyceride, e. g. of oleic acid. The carbamide is advantageously urea, but urethane (ethyl carbamate) is also effective. The commercial bile salts are advantageously commercially pure grades of sodium taurocholate, although other preparations from ox bile, suitably purified, can be used. The thickening agent, which acts as a stabilizer and gives the mixture colloidal properties, is advantageously a specially prepared quince seed extract.

The combination of these five ingredients gives a fluid base which combines many desirable properties including the demulcent action of glycerin, the demulcent and emulsifying action of the gums, the astringent action of alcohol, the antiacid, deodorizing, bacteriostatic, healing action and proteolytic action of the urea, and the carrier, emulsifying, and the wetting action of the bile acids or their salts. In addition, the composition as a whole possesses valuable properties due to the combined properties of the ingredients. The interactions of the several components of the fluid base, both chemically and in physiochemical relationships, are undoubtedly complex, and this complexity carries through to the bacteriostatic synergisms of the ingredients. The ingredients possess groups with strong affinities for each other and for water as well as nonpolar affinities, so that the fluid base may be said to be made up of a physical complex of strong polar affinities with less powerful nonpolar affinities.

An advantageous composition of the fluid base is indicated by the following formula:

| | Per cent |
|---|---|
| Urea | 5.4 |
| Sodium taurocholate (commercially "pure" grade) | 1.4 |
| 1% quince seed extract | 27.0 |
| Glycerin | 4.1 |
| Ethyl alcohol | 11.1 |
| Distilled water | 51.0 |
| Synthetic oil of rose Neil (or other suitable perfuming agent) (optional) | Trace |
| Coloring agent (optional) | Trace |

Such a composition may be made by the following procedure:

To make up a batch of about 8.8 liters of the composition, the following materials are used:

| | | |
|---|---|---|
| 1% quince seed extract containing 10% glycerin and 10% alcohol (95%) | liters | 3 |
| Alcohol (70%) | do | 1.2 |
| Distilled water | do | 4.2 |
| Urea | kilos | .48 |
| Sodium taurocholate | do | .12 |

The water and quince seed extract are mixed and the alcohol added with stirring. The urea and sodium taurocholate are thoroughly mixed and stirred into the solution and tend to dissolve together. Soon after mixing a faint and persistent clouding of the fluid base occurs. The degree of cloudiness obtained varies somewhat with the brand of commercially pure sodium taurocholate used and reaches its maximum in one to two hours. This cloudiness is not removed by ordinary methods of filtration and remains indefinitely in stable suspension.

The quince seed extract is advantageously prepared as follows:

One per cent by weight of quince seed is added to distilled water previously heated to 65° C., and the quince seeds are then allowed to macerate in the water for one hour while the mixture is vigorously stirred with a jet of filtered air. The extract is then filtered thorugh three or four layers of cheese cloth to remove the seeds. To the filtered extract 10% by volume of glycerin is first added and then 10% by volume of 95% alcohol. The quince seed extract so prepared should be combined with the other ingredients of the fluid base promptly to avoid danger of spoilage. If the quince seed extract is to be held before use, the extract, before the addition of the glycerin and alcohol should be autoclaved, e. g., at 15 to 17 pounds pressure for 10 minutes in containers that insure even heating of the extract throughout. The autoclaved extract may then be used without further filtration but if this is desired muslin may be advantageously used.

The fluid base composition produced as above described has a bacteriostatic and mildly bactericidal action against gram negative as well as against gram positive organisms, and the bacteriostatic action is not inhibited by the presence of 10 per cent blood serum. This bacteriostatic action and bactericidal action may be considerably increased by increasing the concentration of the urea, substituting urethane for part or all of the urea, substituting isopropyl alcohol for part of the ethyl alcohol present, by the addition of a very small percentage of citric acid and by the addition of stronger antiseptics with the fluid base acting as a carrier.

The fluid base has other valuable and desirable properties. It appears to have definite softening and wetting action for the hair and skin. This is particularly true when the fluid base is mixed with soap solutions with which it is entirely compatible. When utilized as a vehicle or carrier for fused bentonite sulfur, it has produced no objectionable irritation even under conditions of continuous use for several months. The pH of the fluid base varies, e. g., from about 6.7 to about 8.0, increasing somewhat on standing.

In the fluid base composition the alcohol and urea appear to act synergistically in imparting bacteriostatic and bactericidal action to the composition. The glycerin appears to enhance the bacteriostatic action of the alcohol and urea, particularly in the presence of blood. The quince seed extract imparts colloidal properties to the composition. The commercial sodium taurocholate not only acts as a wetting agent but it contains an active factor or ingredient, which acting synergistically with the other components of the fluid base, produces bacteriostatic action uninhibited by the presence of defibrinated blood, so that the fluid base acts effectively in the presence of blood serum. This active ingredient or factor is presumably a natural component of ox bile which remains present in the so-called "pure" grades of commercial sodium taurocholate but is not present, or at least not active, in chemically pure sodium taurocholate.

This active principle is also present in ox bile and may therefore be considered a natural component of ox bile. In ox bile there is also present a factor which inhibits the bacteriostatic action of the fluid base; and, when powdered ox bile is used instead of commercial sodium taurocholate to produce the fluid base, this inhibiting factor is advantageously removed or greatly reduced by allowing the fluid base made with the powdered ox bile to stand and then filtering through fairly coarse filter paper. The inhibiting factor is apparently precipitated by the alcohol present in the fluid base, so that it can be removed by filtration, while leaving present in the fluid base the bile acids and the active principle or factor.

The active factor present in the commercially pure sodium taurocholate may be partially removed therefrom by treatment with 96 per cent ethyl alcohol, the sodium taurocholate remaining dissolved in the alcohol and a small amount of precipitate being formed which appears to contain free taurine and glycerine, and which contains an amount of the active ingredient equal to many times that contained in a similar amount of the commercial bile salts. The sodium taurocholate recovered from the alcohol solution still contains some of the active ingredient, but in reduced amount, which was nevertheless sufficient to produce a fairly effective bacteriostatic fluid base in the presence of blood serum.

When the active principle or agent is separated from the commercial bile salts or from ox bile in a more concentrated state than that in which it is contained in the commercially pure sodium taurocholate, it can be used in making the fluid base to increase the content of the active principle or to enable a somewhat smaller amount of the commercial bile salts to be used.

In the formula given above the ethyl alcohol can be in part replaced by isopropyl alcohol. Isopropyl alcohol, however, appears to produce more coagulation of the quince gum than the ethyl alcohol, and in general should not be used to the extent of more than an amount equal to the amount of ethyl alcohol. The glycerin can be substituted in part or in whole in some instances with the monoglyceride of oleic acid. The urea can be substituted in part or in whole by urethane. The sodium taurocholate can be substituted in part or in whole by ox bile, with subsequent removal of the inhibiting factor, as above indicated.

For some purposes a more concentrated fluid base is desirable in which less water is present, and such a concentrated fluid base can advantageously be compounded by using the ingredients in the following proportions:

|  | Per cent |
|---|---|
| Urea | 10.3 |
| 1% quince seed extract | 51.3 |
| Sodium taurocholate | 2.6 |
| Glycerin | 7.7 |
| Ethyl alcohol | 21.0 |
| Distilled water | 7.1 |
| Synthetic oil of rose Neil (optional) | Trace |
| Coloring agent (optional) | Trace |

The concentrated fluid base may be prepared in the same manner as the regular fluid base previously described with the exception that the distilled water is omitted. The 70 per cent alcohol should be added to the quince extract slowly and with constant stirring to prevent precipitation of the quince gum.

The fluid base compositions described above are advantageously used with fused bentonite sulfur in the production of emulsions, creams, etc. in which the fluid base serves as a vehicle for the fused bentonite sulfur. The fused bentonite sulfur swells in the fluid base and thickens its consistency. The fused bentonite sulfur used is advantageously that made with Wyoming bentonite and high-grade sulfur, e. g., in the proportions of 30 per cent sulfur and 70 per cent bentonite with the fused product ground finer than 200 mesh before use.

A fused bentonite sulfur emulsion can advantageously be made with the use of a fluid base of the composition illustrated by the first formula above, using the ingredients in the following proportions:

| | Per cent |
|---|---|
| Fused bentonite sulfur | 11.9 |
| Urea | 4.8 |
| Sodium taurocholate | 1.2 |
| 1% quince seed extract | 23.8 |
| Glycerin | 3.6 |
| Ethyl alcohol | 9.7 |
| Distilled water | 45.0 |
| Synthetic oil of rose Neil (optional) | Trace |
| Coloring agent (optional) | Trace |

The fluid base is prepared as above described, and to a batch of about 8.8 liters there is added 1.2 kilos of fused bentonite sulfur, at room temperature of around 25° C., with stirring. Instead of adding the fused bentonite sulfur to the entire amount of fluid base at the outset, a smooth mixture can be obtained somewhat more rapidly by adding the fused bentonite to one-half the volume of fluid base and stirring until maximum thickness is obtained, and then adding the remainder of the fluid base gradually with stirring. The final mixture should be allowed to stand for one to two days with occasional stirring so that any remaining lumps may be dispersed into the emulsion.

A fused bentonite sulfur cream or paste can advantageously be produced by the use of the concentrated fluid base above described. The use of the concentrated base as a vehicle for fused bentonite sulfur to produce the composition in the form of a cream or paste presents certain advantages. The cream has advantages in ease of application and may be prepared of a consistency resembling vanishing cream and may be applied to the human skin in a similar way.

A fused bentonite sulfur cream can advantageously be prepared by the use of the ingredients in the following proportions:

| | Per cent |
|---|---|
| Fused bentonite sulfur | 20.4 |
| Urea | 8.2 |
| Sodium taurocholate | 2.0 |
| 1% quince seed extract | 40.9 |
| Glycerin | 6.1 |
| Ethyl alcohol | 16.7 |
| Distilled water | 5.7 |
| Synthetic oil of rose Neil (optional) | Trace |
| Coloring agent (optional) | Trace |

In compounding this formula the ingredients of the concentrated fluid base are combined as previously described and the powdered fused bentonite sulfur is stirred gradually into this mixture and the stirring continued until maximum thickness is obtained. The mixture is allowed to stand for 24 to 48 hours with occasional stirring until a smooth paste without lumps is obtained. Samples of this cream have stood for several months without drying or other change in characteristics.

The fused bentonite sulfur emulsions and creams, made with the use of the fluid base, have been found to have valuable properties for the treatment of skin infections. Thus, tests in vivo on both animals and humans showed that the fused bentonite sulfur emulsion had marked fungistatic properties in the treatment of epidermophytosis. The composition as a whole possesses both fungistatic and bacteriostatic properties. The fused bentonite sulfur emulsion also appears to have a general emollient and healing action on the skin, probably due to a synergistic action between the fluid base and the fused bentonite sulfur, since neither product acting alone is as effective. Examples of this action is the almost immediate relief from soreness of cuts and abrasions and the almost immediate relief from itching of insect bites. The freshly prepared emulsion has a pH of about 8.1, but after standing for several weeks the pH may drop to around 7.9.

The fused bentonite sulfur compositions made with the fluid base are advantageously used for the preparation of various toilet, cosmetic and medicinal compositions. Thus, the fused bentonite sulfur emulsion can advantageously be used with liquid soap in a shampoo. A shampoo has thus been compounded by combining the fused bentonite sulfur and cream with the concentrated fluid base and with liquid soap in the following proportions:

| | Parts |
|---|---|
| Fused bentonite sulfur cream | 40 |
| Concentrated fluid base | 16 |
| Liquid soap shampoo (35% mild synthetic castile) | 44 |

This shampoo composition has proved unusually effective in the control of dandruff. It apparently has marked cleansing properties, leaving the hair and scalp in a healthy condition with the hair more manageable than usual and with no injurious effects on permanent waves.

The fused bentonite sulfur emulsion can also advantageously be used in admixture with the fluid base in making a dandruff-treating tonic. For making a hair tonic a somewhat more concentrated fluid base can be advantageously used, such as illustrated by the following formula, for the production of one liter of the modified fluid base:

| | | |
|---|---|---|
| 1% quince seed extract (containing 10% alcohol (95%) and 20% glycerin) | ml | 300 |
| Distilled water | ml | 420 |
| Alcohol (70%) | ml | 240 |
| Glycerol mono-oleate | ml | 10 |
| Sodium taurocholate | grams | 24 |
| Urea | do | 96 |

In this formula glycerol mono-oleate is used instead of glycerin.

In compounding this formula the quince seed extract and water are mixed and the alcohol added slowly with stirring. The urea and sodium taurocholate are thoroughly mixed and stirred into the solution and the glycerol mono-oleate is then gradually added with stirring.

This modified fluid base is then admixed with fused bentonite sulfur emulsion, as illustrated by the formula above, in the proportions of 77 parts by weight of the modified fluid base and 23 parts by weight of the fused bentonite sulfur emulsion by adding the fluid base gradually with stirring to the fused bentonite sulfur emulsion. The consistency of the tonic may be somewhat improved by passing it through a homogenizer.

The fluid base itself can advantageously be used as a vehicle in making toilet, cosmetic and medical preparations. Compatible antiseptics, such as powerful germicidal antiseptics, can be added to the fluid base, with the fluid base acting as a carrier and supplementing the action of the added antiseptic by the desirable properties of the fluid base itself.

The fluid base itself can also be advantageously used as a vehicle for other medicinal or pharmaceutical preparations, particularly for external application to the skin. It can thus be used as a vehicle for sulfonamides, particularly for topical application, the insoluble sulfonamides being dispersed in the fluid bases as stable suspensions while the ingredients of the fluid base will tend to increase the solubility of such sulfonamides as sulfadiazine. The fluid base can also be used as a vehicle for the soluble sulfonamides or the soluble salts of the sulfonamides in a range of concentrations limited by their solubilities, toxicities or other therapeutic considerations.

The insoluble sulfonamides as well as the soluble sulfonamides or the soluble salts of the insoluble sulfonamides may also be incorporated in the fused bentonite sulfur emulsion or cream. In these preparations the range of concentrations of the sulfonamides are limited by their miscibilities, toxicities or other therapeutic considerations.

Improved compositions can also be made by incorporating salicylic acid with the fused bentonite sulfur emulsion and the fused bentonite sulfur cream, where a stronger keratolytic action is required, the salicylic action being used and the hydrogen ion concentrations of the emulsion and cream adjusted by appropriate agents to compatability with the presence of free salicylic acid.

The preparation of such a composition by the addition of salicylic acid to the fused bentonite sulfur cream is illustrated by the following formula:

| | Per cent |
|---|---|
| 1% quince seed extract | 38.5 |
| Ethyl alcohol | 15.7 |
| Glycerin | 5.8 |
| Distilled water | 5.3 |
| Urea | 7.7 |
| Sodium taurocholate | 1.9 |
| Fused bentonite sulfur | 19.2 |
| Salicylic acid | 5.9 |

The fused bentonite sulfur cream is prepared in the manner previously described and the salicylic acid powder in pulverized form is thoroughly mixed with the cream and the mixture is allowed to stand several days with occasional stirring.

The fluid bases, and particularly the concentrated fluid base, can advantageously be compounded with other toilet and cosmetic creams. Thus, an improved shaving cream of the brushless type of shaving cream can be produced as follows:

A concentrated fluid base is prepared as above described, 1.2 per cent of glycerin being replaced by 2 per cent of glycerol mono-oleate. One part by weight of this concentrated fluid base is combined with one part by weight of brush shaving cream with stirring, and then two parts by weight of brushless shaving cream are added with stirring until a smooth composition is obtained. This shaving cream produces a marked softening action on the beard without the necessity of preliminary washing of the beard with soap and water. The softening action of the beard appears to carry down into the hair follicles since a much closer shave is obtained than with the brush or brushless shaving creams alone. The protecting action of the cream also appears to be more thoroughly worked into the skin surface than with the brush or brushless cream alone since there is a minimum of scraping and after-shave irritation.

The fluid base or the concentrated fluid base as well as the fused bentonite sulfur emulsion or cream can be compounded with various soap compositions including both liquid soap and soap pastes to give improved soap compositions.

The fluid bases can also advantageously be incorporated in other toilet preparations. Thus, the fluid bases can be incorporated in after-shaving lotions which will have the bacteriostatic (and therefore prophylactic) and healing qualities of these compositions. In making shaving lotions with the use of the fluid base the quince seed extract of the fluid base may advantageously be replaced by methyl cellulose which is less affected by the alcohol contained in a shaving lotion than is the quince seed extract. Thus, a shaving lotion can be compounded by admixing an equal volume of the concentrated fluid base and bay rum, or somewhat varying proportions can be used. The addition of other perfume or coloring material is optional. Such a composition can be made by adding the bay rum to the fluid base with stirring. The same procedure may be used for preparing a number of shaving lotions with the fluid base and witch hazel or other after-shave liquids. The fluid base may thus be compounded with added alcohol, which may be mentholated.

Similarly, shaving lotions can be prepared with the use of fused bentonite sulfur emulsion or cream.

Fused bentonite sulfur itself may be directly added and emulsified with after-shave preparations made from the fluid base and admixed lotion constituents. Thus, where after-shaving lotions or preparations are made from the fluid base with bay rum or witch hazel or alcohol, etc., a small amount, e. g. 1 to 3 per cent of fused bentonite sulfur may be added and dispersed. In general, the alcohol content of the fluid base mixture before admixture of the fused bentonite sulfur should not be higher than 25 per cent by volume for best results in getting an even dispersion of the fused bentonite sulfur. A smooth mixture may be obtained more rapidly by adding the fused bentonite sulfur to a small part, e. g. one-quarter of the volume of the fluid base-lotion mixture and stirring until maximum thickness is obtained, and then adding the remaining three-quarters with further stirring. The final mixture should be allowed to stand for 24 to 48 hours with occasional stirring so that any remaining lumps will be dispersed into the emulsion.

The new fused bentonite sulfur emulsions and creams have been found effective in treating various skin infections. Clinical use of the composition has shown it to be effective in the treatment of ringworm infections, both on human beings and on animals, in the treatment of barber's itch, scabies, acne, and in various fungus infections of unknown etiology. It has also proved effective in the treatment of athlete's foot, dermatitis, insect bites and plant poisoning. It has been found useful for treating small cuts, abrasions, pimples, etc., and to relieve soreness.

It will thus be seen that the present invention provides an improved fluid base with valuable bacteriostatic and other properties which can be used by itself or as a vehicle in the preparation of toilet, cosmetic and medical preparations. It will also be seen that the invention provides a new fused bentonite sulfur composition in which the fused bentonite sulfur is compounded with the fluid base to give a composition having valuable properties in the treatment of infections. It will further be seen that the invention provides various new compositions in which the fluid base or the fused bentonite sulfur composition, or both, are used to produce new special compositions such as shaving creams, shampoos and other soap-containing compositions, after-shave and other toilet preparations, and various combinations with drugs which enable the drugs to be applied in a particularly advantageous manner.

I claim:

1. A fluid base composition containing in an aqueous medium an alcohol selected from the class which consists of ethyl alcohol and a mixture of ethyl and isopropyl alcohols, a glycerin compound selected from the class which consists of glycerin and a monoglyceride, a compound selected from the class which consists of urea and urethane, commercially pure bile salts and quince seed extract, said composition having bacteriostatic action in the presence of 10% blood serum, and being a valuable fluid base for use in the compounding of medicinal, cosmetic and toilet compositions.

2. A fluid base composition containing in an aqueous medium ethyl alcohol, glycerin, urea, commercially pure bile salts and quince seed extract, said composition having bacteriostatic action in the presence of 10% blood serum, and being a valuable fluid base for use in the compounding of medicinal, cosmetic and toilet compositions.

3. A fluid base composition containing in an aqueous medium the following ingredients in approximately the following relative proportions: ethyl alcohol 19.4, glycerin 7.8, urea 10.4, commercially pure sodium taurocholate 2.6, 1% quince seed extract 52.2, said composition having bacteriostatic action in the presence of 10% blood serum, and being a valuable fluid base for use in the compounding of medicinal, cosmetic and toilet compositions.

4. A composition such as defined in the preceding claim which also contains glycerol monooleate.

5. Fused bentonite sulfur compositions containing fused bentonite sulfur and the fluid base composition of claim 1, said composition having valuable bacteriostatic, bactericidal and fungicidal properties and being valuable for the treatment of skin infections.

6. Fused bentonite sulfur compositions containing fused bentonite sulfur and the fluid base composition of claim 2, said composition having valuable bacteriostatic, bactericidal and fungicidal properties and being valuable for the treatment of skin infections.

7. Fused bentonite sulfur compositions containing fused bentonite sulfur and the fluid base composition of claim 3, said composition having valuable bacteriostatic, bactericidal and fungicidal properties and being valuable for the treatment of skin infections.

8. A concentrated fluid base composition containing the following ingredients in approximately the following proportions: ethyl alcohol 19.4, glycerin 7.8, urea 10.4, commercially pure sodium taurocholate 2.6, 1% quince seed extract 52.2, water 7.6, said composition having bacteriostatic action in the presence of 10% blood serum, and being a valuable fluid base for use in the compounding of medicinal, cosmetic and toilet compositions.

9. A fused bentonite sulfur emulsion containing the following ingredients in approximately the following proportions: ethyl alcohol 9.7, glycerol 3.6, urea 4.8, commercially pure sodium taurocholate 1.2, 1% quince seed extract 24, fused bentonite sulfur 12, water 45, said composition having valuable bacteriostatic, bactericidal and fungicidal properties and being valuable for the treatment of skin infections.

10. A fused bentonite sulfur cream containing the following ingredients in approximately the following proportions: ethyl alcohol 15.34, glycerin 6.21, urea 8.28, commercially pure sodium taurocholate 2.07, 1% quince seed extract 41.38, fused bentonite sulfur 20.69, water 6.03, said composition having valuable bacteriostatic, bactericidal and fungicidal properties and being valuable for the treatment of skin infections.

11. A fused bentonite sulfur cream composition containing the following ingredients in approximately the following proportions: ethyl alcohol 14.4, glycerin 5.8, urea 7.8, commercially pure sodium taurocholate 1.9, salicyclic acid 6, 1% quince seed extract 38.9, fused bentonite sulfur 19.5, water 5.7, said composition having valuable bacteriostatic, bactericidal and fungicidal properties and being valuable for the treatment of skin infections.

12. A soap composition containing soap and the fluid base of claim 1.

13. A shampoo composition containing liquid soap and the fluid base of claim 1.

14. A shaving cream in which the shaving cream contains the fluid base of claim 1.

15. A shampoo containing soap and fused bentonite sulfur and the fluid base of claim 1.

16. A tonic composition for external application containing a small proportion of the fluid base of claim 1 and also containing fused bentonite sulfur.

17. A fluid base composition containing the following ingredients in approximately the following proportions: ethyl alcohol 11.1, glycerin 4.1, urea 5.4, commercially pure sodium taurocholate 1.4, 1% quince seed extract 27, water 51, said composition having bacteriostatic action in the presence of 10% blood serum, and being a valuable fluid base for use in the compounding of medicinal, cosmetic and toilet compositions.

JAMES G. VINCENT.

REFERENCES CITED

The following references are of record in the file of this patent:

UNITED STATES PATENTS

| Number | Name | Date |
|---|---|---|
| 1,550,650 | Banks | Aug. 18, 1925 |
| 2,025,655 | Faunce | Dec. 24, 1935 |
| 2,294,233 | Harris | Aug. 25, 1942 |

(Other references on following page)

FOREIGN PATENTS

| Number | Country | Date |
|---|---|---|
| 178,809 | Great Britain | Mar. 9, 1922 |

OTHER REFERENCES

Wise et al.: J. A. M. A., October 3, 1936, "Use of the dermal parasiticides," pages 1126–1132.

Bergy: J. A. P. A., Prac. Pharm. Ed., Oct. 1942, pages 358–364.

Weinstein et al.: Science, Jan. 12, 1945, pages 44–45.

Martindale et al.: The Extra Pharmacopoeia, vol. 1, 20th ed., page 775.

Anonymous: J. A. P. A., Prac. Pharm. Ed., June–July 1944, pages 183–184.